(12) United States Patent
Aydin et al.

(10) Patent No.: US 7,557,482 B2
(45) Date of Patent: Jul. 7, 2009

(54) AXIAL-FLUX ELECTRIC MACHINE

(75) Inventors: Metin Aydin, Istanbul (TR); Mustafa K. Guven, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 425 days.

(21) Appl. No.: 11/495,584

(22) Filed: Jul. 31, 2006

(65) Prior Publication Data
US 2008/0024027 A1    Jan. 31, 2008

(51) Int. Cl.
*H02K 1/22* (2006.01)
(52) U.S. Cl. .................. 310/156.32; 310/266; 310/268
(58) Field of Classification Search ................. 310/266, 310/268, 156.32, 156.36, 156.37, 156.57
See application file for complete search history.

(56) References Cited

U.S. PATENT DOCUMENTS

| | | |
|---|---|---|
| 3,018,396 A | 1/1962 | Colgate |
| 3,069,577 A | 12/1962 | Lee |
| 3,082,337 A | 3/1963 | Horsley |
| 3,334,254 A | 8/1967 | Kober |
| 3,383,533 A | 5/1968 | Jarret et al. |
| 3,394,278 A | 7/1968 | Schetinin |
| 3,401,285 A | 9/1968 | French et al. |
| 3,418,506 A | 12/1968 | Parker |
| 3,432,706 A | 3/1969 | Beyersdorf et al. |
| 3,482,131 A | 12/1969 | Lytle |
| 3,579,277 A | 5/1971 | Imahashi |
| 3,700,943 A | 10/1972 | Heiintz et al. |
| 3,831,071 A | 8/1974 | Mitsui |
| 3,840,764 A | 10/1974 | Burger |
| 3,845,339 A | 10/1974 | Merkle et al. |
| 4,187,441 A | 2/1980 | Oney |
| 4,189,948 A | 2/1980 | Buckley et al. |
| 4,278,927 A | 7/1981 | Grohe |
| 4,308,479 A | 12/1981 | Richter |
| 4,371,801 A | 2/1983 | Richter |
| 4,394,597 A | 7/1983 | Mas |
| 4,405,873 A | 9/1983 | Nondahl |
| 4,410,820 A | 10/1983 | Stanley |
| 4,455,516 A | 6/1984 | Furusho |
| 4,488,075 A | 12/1984 | DeCesare |
| 4,551,645 A | 11/1985 | Takahashi et al. |

(Continued)

FOREIGN PATENT DOCUMENTS

EP    0 052 179 A1    5/1982

(Continued)

*Primary Examiner*—Dang D Le
(74) *Attorney, Agent, or Firm*—Finnegan, Henderson, Farabow, Garrett & Dunner

(57) ABSTRACT

An axial-flux electric machine includes a stator and a rotor. The rotor may be rotatable about a rotor rotation axis, and at least a portion of the stator may face at least a portion of the rotor at an axial interface between the stator and the rotor. The rotor may include a rotor body and a permanent-magnet cluster that includes a plurality of permanent magnets mounted to the rotor body. The permanent-magnet cluster may cause magnetic flux to flow across the axial interface between the permanent-magnet cluster and the stator. The plurality of permanent magnets of the permanent-magnet cluster may include one or more permanent magnets forming a first axial permanent-magnet layer and one or more permanent magnets forming a second axial permanent-magnet layer disposed between the first axial permanent-magnet layer and the axial interface.

20 Claims, 3 Drawing Sheets

U.S. PATENT DOCUMENTS

| | | | |
|---|---|---|---|
| 4,578,610 A | 3/1986 | Kliman et al. | |
| 4,611,139 A | 9/1986 | Godkin et al. | |
| 4,634,912 A | 1/1987 | Heyraud | |
| 4,641,421 A | 2/1987 | Stanley | |
| 4,794,293 A | 12/1988 | Fujisaki et al. | |
| 4,866,321 A | 9/1989 | Blanchard et al. | |
| 4,996,457 A | 2/1991 | Hawsey et al. | |
| 5,028,830 A | 7/1991 | Mas | |
| 5,117,141 A | 5/1992 | Hawsey et al. | |
| 5,168,201 A | 12/1992 | Nomura | |
| 5,179,307 A | 1/1993 | Porter | |
| 5,214,358 A | 5/1993 | Marshall | |
| 5,216,310 A | 6/1993 | Taghezout | |
| 5,245,238 A | 9/1993 | Lynch et al. | |
| 5,334,899 A | 8/1994 | Skybyk | |
| 5,394,321 A | 2/1995 | McCleer et al. | |
| 5,396,140 A | 3/1995 | Goldie et al. | |
| 5,440,185 A | 8/1995 | Allwine, Jr. | |
| 5,477,093 A | 12/1995 | Lamb | |
| 5,477,094 A | 12/1995 | Lamb | |
| 5,619,087 A | 4/1997 | Sakai | |
| 5,633,454 A | 5/1997 | Abe et al. | |
| 5,668,424 A | 9/1997 | Lamb | |
| 5,691,589 A | 11/1997 | Keim et al. | |
| 5,731,649 A | 3/1998 | Caamaño | |
| 5,739,627 A | 4/1998 | Lamb | |
| 5,801,473 A | 9/1998 | Helwig | |
| 5,814,914 A | 9/1998 | Caamaño | |
| 5,831,365 A | 11/1998 | Keim et al. | |
| 5,880,548 A | 3/1999 | Lamb | |
| 5,903,082 A | 5/1999 | Caamaño | |
| 5,925,965 A | 7/1999 | Li et al. | |
| 5,952,758 A | 9/1999 | Lucidarme et al. | |
| 5,973,436 A | 10/1999 | Mitcham | |
| 5,982,070 A | 11/1999 | Caamaño | |
| 5,986,378 A | 11/1999 | Caamaño | |
| 6,034,465 A | 3/2000 | McKee et al. | |
| 6,049,197 A | 4/2000 | Caamaño | |
| 6,154,013 A | 11/2000 | Caamaño | |
| 6,200,426 B1 | 3/2001 | Graf | |
| 6,259,233 B1 | 7/2001 | Caamaño | |
| 6,373,162 B1 * | 4/2002 | Liang et al. | 310/156.53 |
| 6,407,466 B2 | 6/2002 | Caamaño | |
| 6,445,105 B1 | 9/2002 | Kliman et al. | |
| 6,541,887 B2 | 4/2003 | Kawamura | |
| 6,664,689 B2 | 12/2003 | Rose | |
| 6,741,003 B2 | 5/2004 | Naito et al. | |
| 6,803,694 B2 | 10/2004 | Decristofaro et al. | |
| 6,841,916 B2 | 1/2005 | Chiarenza | |
| 6,844,656 B1 | 1/2005 | Larsen et al. | |
| 6,952,064 B2 | 10/2005 | Hiwaki et al. | |
| 6,987,342 B2 | 1/2006 | Hans | |
| 7,042,127 B2 | 5/2006 | Tsuruta et al. | |
| 2002/0067091 A1 | 6/2002 | Kliman et al. | |
| 2003/0111926 A1 | 6/2003 | Decristofaro et al. | |
| 2003/0151326 A1 | 8/2003 | Aminul et al. | |
| 2003/0189386 A1 | 10/2003 | Carl | |
| 2003/0189388 A1 | 10/2003 | Hashimoto et al. | |
| 2004/0046470 A1 | 3/2004 | Decristofaro et al. | |
| 2005/0029886 A1 | 2/2005 | Van Tichelen et al. | |
| 2005/0285468 A1 | 12/2005 | Fukushima et al. | |
| 2006/0022553 A1 * | 2/2006 | Nakayama et al. | 310/268 |
| 2006/0108881 A1 | 5/2006 | Hauger et al. | |

FOREIGN PATENT DOCUMENTS

| | | |
|---|---|---|
| EP | 0 101 252 A2 | 2/1984 |
| EP | 0 729 663 B1 | 9/1996 |
| EP | 1 081 386 A2 | 3/2001 |
| EP | 1 304 790 A1 | 4/2003 |
| GB | 1177247 | 1/1970 |
| GB | 2 358 968 A | 8/2001 |
| GB | 2 381 958 A | 6/2003 |
| WO | WO 84/01478 | 4/1984 |
| WO | WO 96/21965 | 7/1996 |
| WO | WO 00/11777 | 3/2000 |
| WO | WO 00/38302 | 6/2000 |
| WO | WO 01/57988 A1 | 8/2001 |
| WO | WO 02/065616 A1 | 8/2002 |
| WO | WO 03/003546 A1 | 1/2003 |
| WO | WO 03/0007456 A1 | 2/2003 |
| WO | WO 03/034575 A2 | 4/2003 |
| WO | WO 2004/073143 | 8/2004 |
| WO | WO 2004/107539 | 12/2004 |
| WO | WO 2005/119886 A2 | 12/2005 |

* cited by examiner

AXIAL-FLUX ELECTRIC MACHINE

TECHNICAL FIELD

The present disclosure relates to electric machines having a stator and a rotor and, more particularly, to axial-flux electric machines having a stator and a rotor.

BACKGROUND

Many electric machines, such as electric motors and electric generators, include a stator and a rotor that rotates around a rotor rotation axis adjacent the stator. Such electric machines may use magnetic flux to transfer power between the stator and the rotor. The rotor of some electric machines includes permanent magnets that create north magnetic poles of the rotor and permanent magnets that create south magnetic poles of the rotor. Magnetic flux may flow from the permanent magnets forming the north magnetic poles of the rotor, through the stator, to the permanent magnets forming the south magnetic poles of the rotor. In the case of axial-flux electric machines, the magnetic flux may flow across an axial gap in the direction of the rotor rotation axis as it flows between the rotor and the stator.

Unfortunately, axial-flux electric machines often have all of their permanent magnets mounted to an outer surface of the rotor, such as with adhesive. This may provide a relatively weak connection between the permanent magnets and the rotor, which may preclude operating the electric machine in manners and/or circumstances that would cause high forces on the permanent magnets. For example, attaching permanent magnets to an outer surface of the rotor of an axial-flux electric machine may preclude rotating the rotor at high speeds because high centrifugal forces may detach the permanent magnets from the rotor.

Published U.S. Patent Application No. 2005/0029886 A1 to Van Tichelen et al. ("the '886 application") shows an axial-flux electric machine having permanent magnets that are clamped into a rotor. The axial-flux electric machine shown by the '886 application includes a rotor and a stator disposed adjacent one another along an axis that the rotor rotates about. Each of the permanent magnets of the '886 application is disposed in a passage extending through the rotor parallel to the axis that the rotor rotates about. Plates bolted to the side of the rotor adjacent the stator cover the ends of the passages adjacent the stator, and a ring of material bolted to an opposite side of the rotor covers the ends of the passages opposite the stator. In the axial-flux electric machine disclosed by the '886 application, each permanent magnet creates a magnetic pole of the rotor.

Although the '886 application shows an axial-flux electric machine with permanent magnets clamped into its rotor, certain disadvantages persist. For example, using a single permanent magnet to create each magnetic pole of the rotor of an axial-flux electric machine may limit the power potential of the axial-flux electric machine because a single permanent magnet may produce a relatively weak magnetic field. Additionally, using a single permanent magnet to create each magnetic pole of the rotor of an axial-flux electric machine may limit the constant power speed range of the axial-flux electric machine when the axial-flux electric machine operates as an electric motor.

The axial-flux electric machine and methods of the present disclosure solve one or more of the problems set forth above.

SUMMARY OF THE INVENTION

One disclosed embodiment relates to an axial-flux electric machine that includes a stator and a rotor. The rotor may be rotatable about a rotor rotation axis, and at least a portion of the stator may face at least a portion of the rotor at an axial interface between the stator and the rotor. The rotor may include a rotor body and a permanent-magnet cluster that includes a plurality of permanent magnets mounted to the rotor body. The permanent-magnet cluster may cause magnetic flux to flow across the axial interface between the permanent-magnet cluster and the stator. The plurality of permanent magnets of the permanent-magnet cluster may include one or more permanent magnets forming a first axial permanent-magnet layer and one or more permanent magnets forming a second axial permanent-magnet layer disposed between the first axial permanent-magnet layer and the axial interface.

Another embodiment relates to a method of operating an axial-flux electric machine that includes a stator and a rotor, the rotor including a rotor body. The method may include selectively causing the rotor to rotate about a rotor rotation axis with at least a portion of the stator facing at least a portion of the rotor at an axial interface between the stator and the rotor. Additionally, the method may include causing magnetic flux to flow across the axial interface between the stator and a plurality of permanent magnets mounted to the rotor body. This may include causing magnetic flux to flow across the axial interface between the stator and one or more permanent magnets forming a first axial permanent-magnet layer of the permanent-magnet cluster. It may also include causing magnetic flux to flow across the axial interface between the stator and one or more permanent magnets forming a second axial permanent-magnet layer of the permanent-magnet cluster, the second axial permanent-magnet layer being disposed between the first axial permanent-magnet layer and the axial interface.

A further embodiment relates to an axial-flux electric machine that includes a stator and a rotor. The rotor may be rotatable about a rotor rotation axis, and at least a portion of the stator may face at least a portion of the rotor at an axial interface between the rotor and the stator. The rotor may include a rotor body that includes a rotor core. The rotor may also include a permanent-magnet cluster that includes a plurality of permanent magnets mounted to the rotor body. The permanent-magnet cluster may cause magnetic flux to flow across the axial interface between the permanent-magnet cluster and the stator. The plurality of permanent magnets of the permanent-magnet cluster may include a plurality of permanent magnets forming a first axial permanent-magnet layer that substantially magnetically isolates portions of the rotor body disposed inside the permanent-magnet cluster from portions of the rotor body disposed outside of the permanent-magnet cluster.

DETAILED DESCRIPTION

Figure 1:
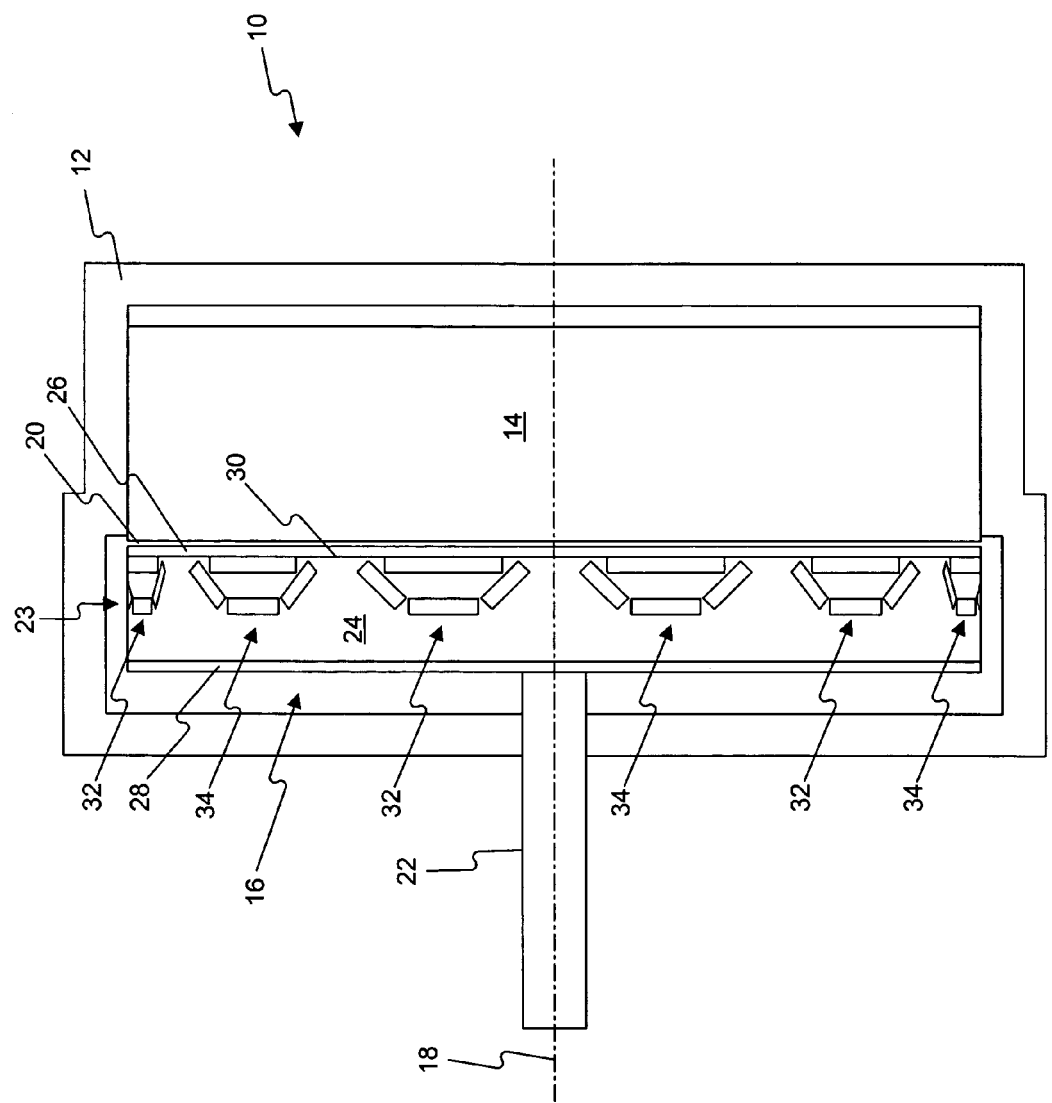
FIG. 1 is a diagrammatic illustration of one embodiment of an axial-flux electric machine according to the present disclosure.

FIG. 1 illustrates an axial-flux electric machine 10 according to the present disclosure. Axial-flux electric machine 10 may be configured to operate as an electric motor and/or an electric generator. Axial-flux electric machine 10 may include a housing 12, a stator 14, and a rotor 16.

Housing 12 may support stator 14 and rotor 16. Housing 12 may support rotor 16 in a manner allowing rotor 16 to rotate about a rotor rotation axis 18. Housing 12 may support stator 14 in a stationary position that creates an axial interface between stator 14 and rotor 16. As used herein, the term "axial interface" refers to an interface whereat a portion of rotor 16 facing generally in the direction of rotor rotation axis 18 faces a portion of stator 14 that faces generally in an opposite direction. As FIG. 1 shows, in some embodiments, rotor 16 and rotor 14 may adjoin a gap in the direction of rotor rotation axis 18 at axial interface 20. Additionally, in some embodiments, axial-flux electric machine 10 may include one or more structures in axial interface 20 between rotor 16 and stator 14.

Stator 14 may include windings of an electrical conductor (not shown), such as wire. In some embodiments, such windings of electrical conductor may be configured to receive electricity from an electrical power source and produce a rotating magnetic field. Additionally, in some embodiments, such coils of electrical conductor may be configured to produce electrical current when exposed to a rotating magnetic field produced by rotating rotor 16. Various materials may compose a core of stator 14, including, but not limited to, soft magnetic material and amorphous steel. In embodiments where amorphous steel forms a core of stator 14, the core may have laminations of various thicknesses.

Rotor 16 may include a rotor shaft 22 and a rotor body 23. The rotor body 23 may include a rotor hub (not shown), a rotor core 24, and reinforcements 26, 28. The rotor hub may extend around and attach to rotor shaft 22. Rotor core 24 may extend around and attach to the rotor hub. Rotor core 24 may have an outer surface 30 that faces axial interface 20. Reinforcement 26 may adjoin outer surface 30, and reinforcement 28 may adjoin an opposite surface of rotor core 24. Rotor core 24 may have relatively high magnetic permeability, while the rotor hub and reinforcement 26 may have relatively low magnetic permeability. Various materials may form rotor core 24, including, but not limited to soft magnetic materials and amorphous steel. In embodiments where amorphous steel forms rotor core 24, rotor core 24 may have laminations of various thicknesses.

Rotor 16 may also include permanent magnets, some or all of which may form permanent-magnet clusters 32, 34. As used herein, the term permanent-magnet cluster refers to two or more permanent magnets arranged in a group. As FIG. 1 shows, permanent-magnet clusters 32 and permanent magnet clusters 34 may occupy alternating positions around rotor rotation axis 18. As is discussed in more detail hereinbelow, each permanent-magnet cluster 32 may create a north magnetic pole of rotor 16, and each permanent-magnet cluster 34 may create a south magnetic pole of rotor 16.

Figure 2:
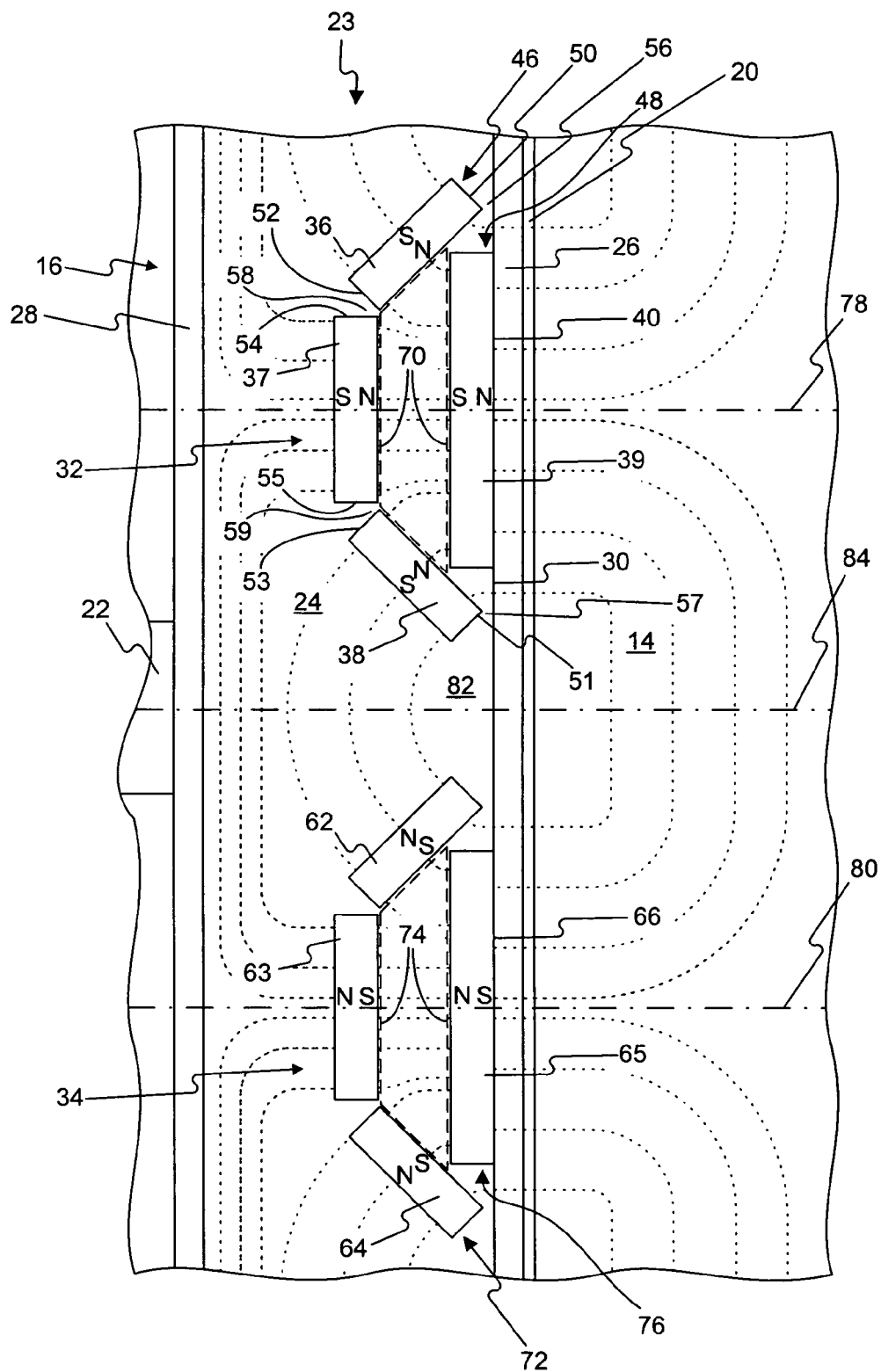
FIG. 2 is a close-up view of a rotor and stator of an axial-flux electric machine according to one embodiment of the present disclosure.

FIG. 2 is a close-up view of a pair of permanent-magnet clusters 32, 34, showing the magnetic flux (dashed lines) created by those permanent-magnet clusters 32, 34. Permanent-magnet cluster 32 may include permanent magnets 36-39, and permanent-magnet cluster 34 may include permanent magnets 62-65. Permanent magnets 36-39, 62-65 may be any types of permanent magnets, including, but not limited to, bonded magnets, NdFeB magnets, and SmC magnets.

Rotor body 23 may surround each of permanent magnets 36-39. Rotor core 24 may surround each of permanent magnets 36-38, 62-64. Each of permanent magnets 39, 65 may be inset in rotor core 24 with a surface 40, 66 disposed outside of rotor core 24 and facing axial interface 20. Reinforcement 26 may cooperate with rotor core 24 to surround permanent magnets 39, 65.

Permanent magnets 36-39 may form multiple layers relative to axial interface 20. Permanent magnets 36, 37, 38 may form an axial permanent-magnet layer 46, and permanent magnet 39 may form an axial permanent-magnet layer 48 that is disposed between axial permanent-magnet layer 46 and axial interface 20. Ends 50, 51 of permanent magnets 36, 38 may form the ends of axial permanent-magnet layer 46 adjacent outer surface 30. From ends 50, 51, permanent magnets 36, 38 may converge as they extend away from axial interface 20. Permanent magnets 36, 38 may terminate at ends 52, 53 adjacent ends 54, 55 of permanent magnet 37. As FIG. 2 shows, the perimeter of each permanent magnet 36-38 may substantially consist of straight sides and, thus, the perimeter of axial permanent-magnet layer 46 between ends 50, 51 may substantially consist of straight sides.

As mentioned above, permanent-magnet cluster 32 may create a north magnetic pole of rotor 16. The north magnetic pole of permanent magnet 39 may face axial interface 20 from outside of rotor core 24 on surface 40. This may ensure that magnetic flux generated by the north magnetic pole of permanent magnet 39 flows primarily in the direction of rotor rotation axis 18 across reinforcement 26 and axial interface 20 into stator 14. The north magnetic poles of permanent magnets 36-38 may face into a portion 70 of rotor core 24 disposed inside permanent-magnet cluster 32 and generally toward axial interface 20.

The configuration of permanent-magnet cluster 32 may force the magnetic flux generated by the north magnetic poles of permanent magnets 36-38 to also flow primarily in the direction of rotor rotation axis 18 across reinforcement 26 and axial interface 20 into stator 14. Axial permanent-magnet layer 46 may substantially magnetically isolate portion 70 of rotor core 24 from portions of rotor core 24 disposed outside of permanent-magnet cluster 32. Permanent magnets 36-38 have a low permeability to magnetic flux and, therefore, substantially prevent magnetic flux from entering or exiting portion 70 of rotor core 24 by flowing across permanent magnets 36-38. Additionally, magnetic flux from permanent magnets 36-38 may saturate portions 56, 57, 58, 59 of rotor core 24 adjacent ends 50-55 of permanent magnets 36-38. This may substantially prevent magnetic flux from entering or exiting portion 70 of rotor core 24 through portions 56-59 of rotor core 24. Thus, the configuration of axial permanent-magnet layer 46 may force the majority of magnetic flux generated by the north magnetic poles of permanent magnets 36-38 to leave permanent-magnet cluster 32 by flowing primarily in the direction of rotor rotation axis 18 across reinforcement 26 and axial interface 20 into stator 14.

Permanent-magnet cluster 34 and permanent magnets 62-65 may replicate permanent-magnet cluster 32 and permanent magnets 36-39 in form and function, except that permanent-magnet cluster 34 may create a south magnetic pole of rotor 16. Permanent magnets 62-64 may form an axial permanent-magnet layer 72 that substantially magnetically isolates a portion 74 of rotor core 24 disposed inside permanent-magnet cluster 34 from portions of rotor core 24 disposed outside of permanent-magnet cluster 34. Permanent magnet 65 may form an axial permanent-magnet layer 76 disposed between axial permanent-magnet layer 72 and axial interface 20. The south magnetic poles of permanent magnets 62-65, rather than the north magnetic poles, may face axial interface 20. As a result, permanent-magnet cluster 34 may cause magnetic flux to flow primarily in the direction of rotor rotation axis 18 across axial interface 20 and reinforcement 26 to the south magnetic poles of permanent magnets 62-65.

Thus, the north and south magnetic poles created by permanent-magnet clusters 32, 34, stator 14, and portions of rotor core 24 disposed outside of permanent-magnet clusters 32, 34 may form a complete magnetic circuit. Magnetic flux may flow from the north magnetic poles of permanent magnets 36-39 of permanent-magnet cluster 32, across reinforcement 26 and axial interface 20 into stator 14, through stator 14, and across axial interface 20 and reinforcement 26 to the south magnetic poles of permanent magnets 62-65 of permanent-magnet cluster 34. At the same time, magnetic flux from the north magnetic poles of permanent magnets 62-65 of permanent-magnet cluster 34 may flow through portions of rotor core 24 disposed outside of permanent-magnet clusters 32, 34 to the south magnetic poles of permanent magnets 36-39 of permanent-magnet cluster 32.

In addition to creating north and south magnetic poles of rotor 16, permanent-magnet clusters 32, 34 may define the locations of "d" axes 78, 80 of rotor 16, which are axes along which rotor 16 has its highest reluctance. Permanent magnets 36-39, 62-65 may greatly impede magnetic flux generated by stator 14 from flowing parallel to rotor rotation axis 18 through the portions of rotor core 24 occupied by permanent-magnet clusters 32, 34. Magnetic flux from stator 14 may encounter particularly high resistance flowing across rotor 16 through the center of permanent-magnet cluster 32, where it must cross both permanent magnet 39 and permanent magnet 37. Accordingly, "d" axis 78 may extend across permanent magnets 37, 39. For the same reason, "d" axis 80 may extend across permanent magnets 63, 65. Conversely, magnetic flux generated by stator 14 may encounter particularly low resistance flowing through a portion 82 of rotor core 24 disposed between permanent-magnet clusters 32, 34. Accordingly, a "q" axis 84 of rotor 16, which is an axis along which rotor 16 has its lowest reluctance, may extend through portion 82 of rotor core 24.

Figure 3:
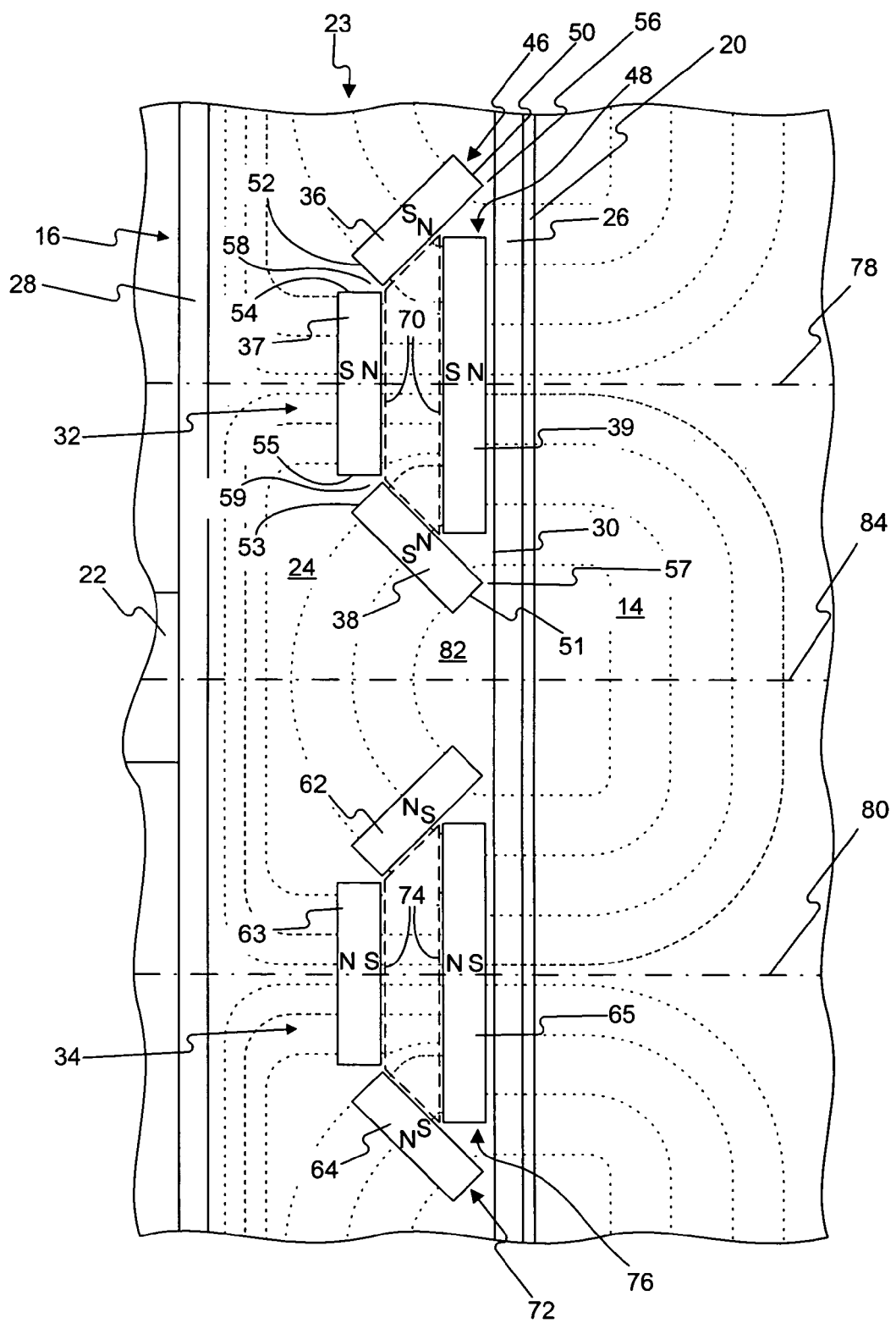
FIG. 3 is a close-up view of a rotor and stator of an axial-flux electric machine according to another embodiment of the present disclosure.

FIG. 3 shows another embodiment of permanent-magnet clusters 32, 34 according to the present disclosure. The embodiment of permanent-magnet clusters 32, 34 shown in FIG. 3 differs from the embodiment shown in FIG. 2 only in that permanent magnets 39 and 65 are disposed within rotor core 24, inward of outer surface 30. Thus, in the embodiment shown in FIG. 3, rotor core 24 surrounds each of permanent magnets 36-39, 62-65.

Axial-flux electric machine 10 is not limited to the exemplary configurations shown in FIGS. 1-3 and discussed above. For example, axial-flux electric machine 10 may include other rotors and/or stators in addition to rotor 16 and stator 14. Additionally, one or more of permanent-magnet clusters 32, 34 may have different numbers and/or arrangements of permanent magnets. Each axial permanent-magnet layer 46, 48, 72, 76 may include more or fewer permanent magnets than shown in FIGS. 1-3. For example, in place of permanent magnet 39, multiple permanent magnets may form axial permanent-magnet layer 48, and/or multiple permanent magnets may form axial permanent-magnet layer 76 in place of permanent magnet 65. Additionally, in some embodiments, a single permanent magnet may form each of axial permanent-magnet layers 46, 72. Furthermore, permanent-magnet clusters 32, 34 may omit axial permanent-magnet layers 48, 76. Alternatively, in addition to permanent magnets 36-39, 62-65 and axial permanent-magnet layers 46, 48, 72, 76, permanent-magnet clusters 32, 34 may include other permanent magnets and/or axial permanent-magnet layers. Additionally, in some embodiments, axial permanent-magnet layers 46, 48, 72, 76 may have different shapes than shown in FIGS. 1-3. For example, axial permanent-magnet layer 48 and/or axial permanent-magnet layer 48 and/or axial permanent-magnet layer 76 may extend into rotor core 24 between their ends, rather than extending in a straight line. Additionally, similar to permanent magnets 39, 65 in the embodiment shown in FIG. 2, one or more permanent magnets of axial permanent-magnet layers 46, 72 may have surfaces disposed outside of rotor core 24.

Additionally, permanent magnets 36-39, 62-65 may have different constructions than discussed above. For example, rather than straight sides and square corners, one or more of permanent magnets 36-39, 62-65 may have rounded sides and/or corners. Additionally, permanent magnets 36-39, 62-65 may have different sizes than shown in FIGS. 1-3. Furthermore, one or more of permanent magnets 36-39, 62-65 may be a type of magnet other than a bonded magnet, an NdFeB magnet, or an SmC magnet. Moreover, rotor 16 may omit reinforcement 26 and/or reinforcement 28.

INDUSTRIAL APPLICABILITY

Axial-flux electric machine 10 may have application in any system requiring an electric motor and/or an electric generator. When an electrical power source supplies electricity to stator 14 in a manner to cause stator 14 to generate a rotating magnetic field, the magnetic flux flowing from permanent-magnet cluster 32, through stator 14, to permanent-magnet cluster 34 may interact with the rotating magnetic field to apply torque to rotor 16. This may cause rotor 16 to rotate around rotor rotation axis 18 and drive any loads connected thereto. When a mechanical power source rotates rotor 16 about rotor rotation axis 18, the magnetic flux flowing from permanent-magnet cluster 32, through stator 14, to permanent-magnet cluster 34 may follow the rotation of rotor 16 and induce electric current in the windings of electrical conductor of stator 14.

The disclosed embodiments of axial-flux electric machine 10 may have high power capacity, whether operating as an electric motor or an electric generator. Employing multiple permanent magnets 36-39, 62-65 to create a magnetic pole of rotor 16 may contribute to that magnetic pole generating a large quantity of magnetic flux. Additionally, arranging permanent magnets 36-39, 62-65 of permanent-magnet clusters 32, 34 into multiple axial permanent-magnet layers 46, 48, 72, 76 may enable fitting them into relatively small circumferential segments of rotor 16. This may give the north and south magnetic poles created by permanent-magnet clusters 32, 34 relatively high flux density. Furthermore, as discussed above, the disclosed configurations of permanent-magnet clusters 32, 34 may ensure that magnetic flux flowing from the north magnetic poles of permanent magnets 36-39 and magnetic flux flowing to the south magnetic poles of permanent magnets 62-65 flows primarily through stator 14. Moreover, placing outer surfaces 40, 66 of permanent magnets 39, 65 outside of rotor core 24 may allow magnetic flux to flow between permanent magnets 39, 65 and stator 14 without flowing through rotor core 24, which would diminish the strength of the magnetic flux.

The disclosed embodiments of axial-flux electric machine 10 may also have a relatively large constant power speed range when operating as an electric motor. Arranging permanent magnets 36-39, 62-65 in permanent-magnet clusters 32, 34 may give rotor 16 a relatively high reluctance along "d" axes 78, 80. Aligning permanent magnet 37, 39 so that "d"

axis 78 extends across both permanent magnets 37, 39 and aligning permanent magnets 63, 65 so that "d" axis 80 extends across both permanent magnets 63, 65 may give rotor 16 particularly high reluctance along "d" axes 78, 80. Furthermore, insetting permanent magnets 36-39, 62-65 in rotor core 24 may cause rotor 16 to have a relatively low reluctance along "q" axis 84 by providing portion 82 of rotor core 24 through which magnetic flux may readily flow. As a result, rotor 16 may have a relatively high ratio of reluctance along "d" axes 78, 80 to reluctance along "q" axis 84, which may give axial-flux electric machine 10 a relatively large constant power speed range when operating as an electric motor.

Additionally, the disclosed embodiments of rotor 16 may combine high structural integrity and low cost. Surrounding permanent magnets 36-39, 62, 65 with rotor body 23 may securely retain permanent magnets 36-39, 62-65 to rotor 16. Additionally, by surrounding permanent magnets 36-39, 62-65, rotor body 23 may help maintain the shapes of permanent magnets 36-39, 62-65, thereby reducing internal stresses in permanent magnets 36-39, 62-65 and helping to prevent them from deforming or fracturing. This may enable constructing permanent magnets 36-39 out of relatively low strength materials, such as low-cost bonded magnet material, while maintaining desirable levels of structural integrity. Reinforcements 26, 28 may also contribute to the structural integrity of rotor 16 at a relatively low cost. Additionally, constructing permanent magnets 36-39, 62-65 and, thus, axial permanent-magnet layers 46, 48, 72, 76 with straight-sided perimeters may keep the costs of forming permanent magnets 36-39, 62-65 and the corresponding cavities in rotor core 24 low.

It will be apparent to those skilled in the art that various modifications and variations can be made in the axial-flux electric machine and methods without departing from the scope of the disclosure. Other embodiments of the disclosed axial-flux electric machine and methods will be apparent to those skilled in the art from consideration of the specification and practice of the axial-flux electric machine and methods disclosed herein. It is intended that the specification and examples be considered as exemplary only, with a true scope of the disclosure being indicated by the following claims and their equivalents.

What is claimed is:

1. An axial-flux electric machine, comprising:
   a stator;
   a rotor that is rotatable about a rotor rotation axis, wherein at least a portion of the stator faces at least a portion of the rotor at an axial interface between the stator and the rotor, and wherein the rotor includes
   a rotor body including a rotor core, and
   a permanent-magnet cluster including a plurality of permanent magnets mounted to the rotor body, wherein the permanent-magnet cluster causes magnetic flux to flow across the axial interface between the permanent-magnet cluster and the stator, and wherein the plurality of permanent magnets includes
      one or more permanent magnets forming a first axial permanent-magnet layer, and
      one or more permanent magnets forming a second axial permanent-magnet layer disposed between the first axial permanent-magnet layer and the axial interface, a portion of the rotor core disposed between the first axial permanent magnet layer and the second axial permanent magnet layer.

2. The axial-flux electric machine of claim 1, wherein the rotor body surrounds at least one of the plurality of permanent magnets.

3. The axial-flux electric machine of claim 1, wherein at least one of the plurality of permanent magnets is constructed of bonded magnet material and is surrounded by the rotor body.

4. The axial-flux electric machine of claim 1, wherein the rotor body surrounds each of the plurality of permanent magnets.

5. The axial-flux electric machine of claim 1, wherein:
   the one or more permanent magnets forming the first axial permanent-magnet layer are mounted to the rotor core;
   the portion of the rotor core disposed between the first axial permanent magnet layer and the second axial permanent magnet layer is disposed inside the permanent magnet cluster, and
   the first axial permanent-magnet layer substantially magnetically isolates the portion of the rotor core disposed inside the permanent-magnet cluster from portions of the rotor core disposed outside the permanent-magnet cluster.

6. The axial-flux electric machine of claim 5, wherein the rotor body further includes a reinforcement constructed of nonmagnetically permeable material disposed against an outer surface of the rotor core that faces the axial interface.

7. The axial-flux electric machine of claim 1, wherein:
   the first axial permanent-magnet layer is mounted to the rotor core and includes a first end and a second end, the first end and the second end being disposed adjacent an outer surface of the rotor core that faces the axial interface; and
   from the first end and the second end, the first axial permanent-magnet layer extends away from the axial interface as the first axial permanent-magnet layer converges.

8. The axial-flux electric machine of claim 1, wherein
   at least one of the one or more permanent magnets of the second axial permanent-magnet layer includes a surface disposed outside of the rotor core and facing the axial interface.

9. The axial-flux electric machine of claim 1, wherein an axis along which the rotor has its maximum reluctance extends across at least one of the one or more permanent magnets of the first axial permanent-magnet layer and across at least one of the one or more permanent magnets of the second axial permanent-magnet layer.

10. A method of operating an axial-flux electric machine, the axial-flux electric machine including a stator and a rotor, the rotor including a rotor body, the rotor body including a rotor core, the method comprising:
    selectively causing the rotor to rotate about a rotor rotation axis with at least a portion of the stator facing at least a portion of the rotor at an axial interface between the stator and the rotor; and
    causing magnetic flux to flow across the axial interface between the stator and a plurality of permanent magnets mounted to the rotor body, including
       causing magnetic flux to flow across the axial interface between the stator and one or more permanent magnets forming a first axial permanent-magnet layer of a permanent-magnet cluster, and
    causing magnetic flux to flow across the axial interface between the stator and one or more permanent magnets forming a second axial permanent-magnet layer of the permanent-magnet cluster, the second axial permanent-magnet layer being disposed between the first axial permanent-magnet layer and the axial interface and a portion of the rotor core being disposed between the first axial permanent magnet layer and the second axial permanent magnet layer.

11. The method of claim 10, wherein:
the one or more permanent magnets of the first axial permanent-magnet layer are mounted to the rotor core; and
the portion of the rotor core disposed between the first axial permanent magnet layer and the second axial permanent magnet layer is disposed inside the permanent magnet cluster, and
the method further includes substantially magnetically isolating the portion of the rotor body disposed inside the permanent-magnet cluster from portions of the rotor body disposed outside the permanent-magnet cluster with the first axial permanent-magnet layer.

12. The method of claim 11, wherein the rotor body includes a reinforcement constructed of nonmagnetically permeable material disposed against a surface of the rotor body that faces the axial interface.

13. The method of claim 10, wherein the rotor body surrounds at least one of the plurality of permanent magnets.

14. The method of claim 10, wherein the rotor body surrounds each of the plurality of permanent magnets.

15. An axial-flux electric machine, comprising:
a stator;
a rotor that is rotatable about a rotor rotation axis, wherein at least a portion of the stator may face at least a portion of the rotor at an axial interface between the rotor and the stator, and wherein the rotor includes
a rotor body, including a rotor core;
a permanent-magnet cluster that includes a plurality of permanent magnets mounted to the rotor body, wherein the permanent-magnet cluster causes magnetic flux to flow across an axial interface between the rotor and the stator, and wherein the plurality of permanent magnets include
a plurality of permanent magnets forming a first axial permanent-magnet layer that substantially magnetically isolates a portion of the rotor core disposed inside the permanent-magnet cluster from portions of the rotor core disposed outside the permanent-magnet cluster.

16. The axial-flux electric machine of claim 15, wherein:
the first axial permanent-magnet layer includes a first end and a second end, the first end and the second end being disposed adjacent an outer surface of the rotor core that faces the axial interface; and
from the first end and the second end, the first axial permanent-magnet layer extends away from the axial interface as the first axial permanent-magnet layer converges.

17. The axial-flux electric machine of claim 16, wherein a perimeter of the first axial permanent-magnet layer extending between the first end and the second end substantially consists of straight sides.

18. The axial-flux electric machine of claim 16, wherein the rotor body further includes a reinforcement constructed of nonmagnetically permeable material disposed against the outer surface of the rotor core that faces the axial interface.

19. The axial-flux electric machine of claim 15, wherein the plurality of permanent magnets of the permanent-magnet cluster further include one or more permanent magnets forming a second axial permanent-magnet layer disposed between the first axial permanent-magnet layer and the axial interface.

20. The axial-flux electric machine of claim 19, wherein:
the rotor body includes a rotor core;
the first axial permanent-magnet layer is mounted to the rotor core; and
at least one of the one or more permanent magnets of the second axial permanent-magnet layer includes a surface disposed outside of the rotor body and facing the axial interface.

* * * * *